I. BARNETT.
MACHINE FOR TREATING CLOTH.
APPLICATION FILED NOV. 18, 1910.
1,113,532.
Patented Oct. 13, 1914.
2 SHEETS—SHEET 1.
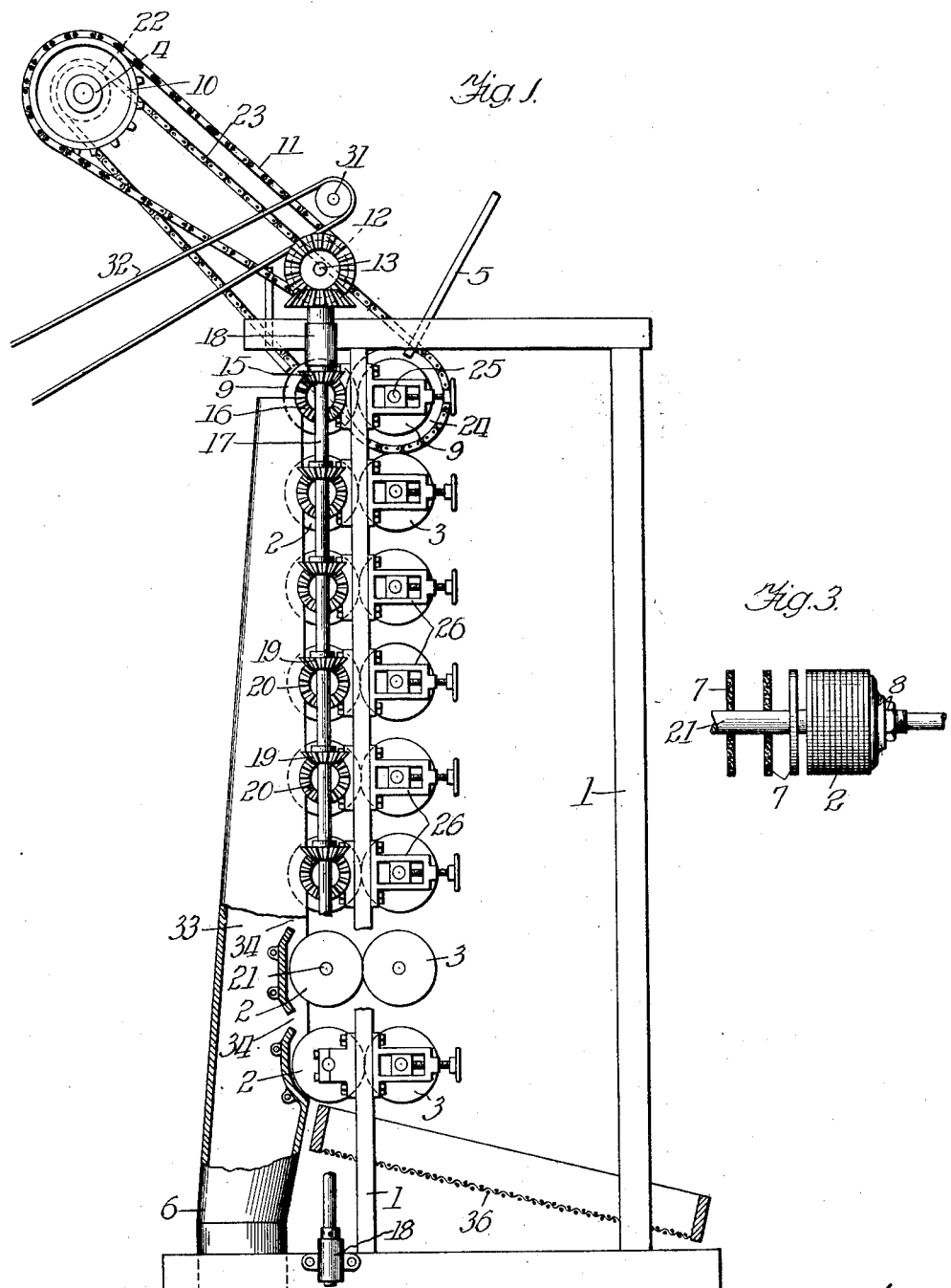

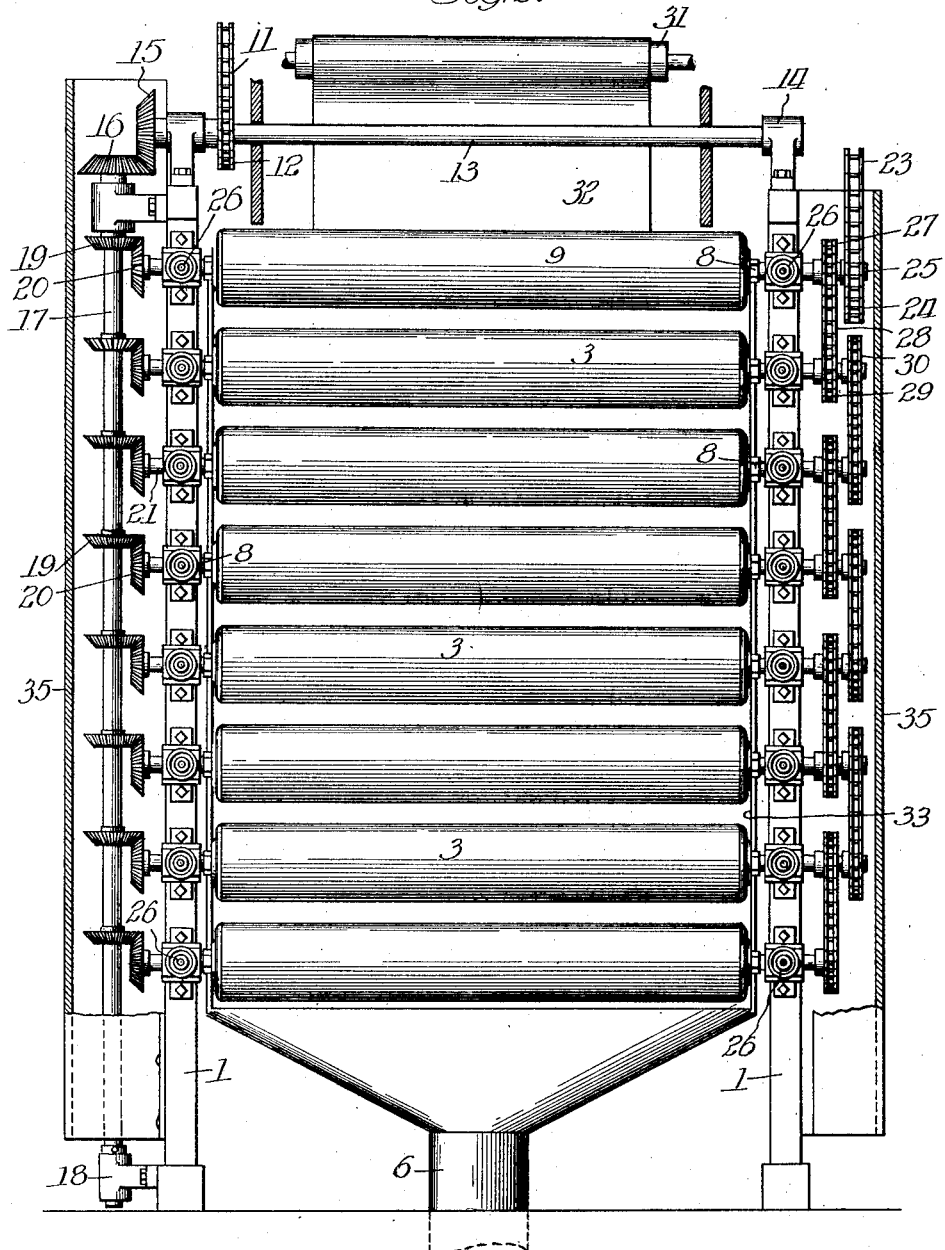

UNITED STATES PATENT OFFICE.

ISRAEL BARNETT, OF MILWAUKEE, WISCONSIN.

MACHINE FOR TREATING CLOTH.

1,113,532.  Specification of Letters Patent.  Patented Oct. 13, 1914.

Original application filed October 5, 1910, Serial No. 585,504. Divided and this application filed November 18, 1910. Serial No. 593,022.

*To all whom it may concern:*

Be it known that I, ISRAEL BARNETT, a citizen of the United States, residing at Milwaukee, in the county of Milwaukee and State of Wisconsin, have invented new and useful Improvements in Machines for Treating Cloth, of which the following is a full, clear, concise, and exact description, reference being had to the accompanying drawing, forming a part of this specification.

My invention relates to a machine for separating animal fibers from vegetable fibers.

This application is a division of my prior application, Serial No. 585,504, filed October 5, 1910, in which I have described and claimed an improved process of separating animal fiber from vegetable fiber.

As I have indicated in my process application, fabrics containing animal fiber and vegetable fiber find extensive use in the arts. These fabrics consist of wool, horse-hair or similar wiry fibers interwoven with suitable vegetable fibers such, for example, as cotton. It is well known that although the vegetable fiber used is comparatively cheap, these fabrics are expensive on account of the cost of the animal fiber. It is also well known that in the use of these fabrics when applied in the arts, a certain amount of this valuable material assumes the form of scraps when the material is cut. These scraps are valuable on account of the amount of expensive animal fiber which they contain. In order to reclaim this valuable animal fiber, it is first necessary to break down or carbonize the vegetable material which is interwoven with it. This is preferably accomplished by subjecting the scraps to the action of an acid such as hydrochloric or sulfuric, which eats out or carbonizes the fibrous structure of the vegetable fiber. Machines have been developed by which, after such a treatment, fabrics containing wool may be separated without serious difficulty. These machines subject the scrap material to a beating or shaking process and a passage through screens in order to separate the vegetable material from the animal fiber. These machines are impracticable when applied to the separation of treated scraps containing hair since it is found that they are inefficient and result in such unsatisfactory treatment, separating only a portion of the hair since some of it passes through the screens, and mutilation of the hair due to the beating action, as to materially decrease its market value when obtained, so that in effect a large proportion of the valuable material in these scraps has been thrown away, or the valuable hair contained in them has been practically ruined.

The object of my invention is to provide an improved machine for separating animal fibers from vegetable fibers.

A further object of my invention is to provide a machine which will effectually separate all of the animal fibers from any vegetable fibers which may be associated with it.

A further object of my invention is to provide a machine which will effectually separate animal fibers from vegetable fibers without decreasing the value of the animal fibers.

A further object of my invention is to provide a machine which will be economical and rapid in operation and at the same time effectually separate the animal fibers from the vegetable fibers associated therewith.

A further object of my invention is to provide an improved machine which is particularly adapted for the separation of such animal fibers as horse hair or similar wiry fibers, so that the valuable animal fiber contained in scraps of hair cloth or like materials, may be reclaimed.

Other objects and advantages of my improved construction will hereinafter appear.

I have illustrated in the accompanying drawings one form which my improved machine may assume in practice.

The views are as follows:—Figure 1 is a side elevation of my improved machine. Fig. 2 shows a transverse partially sectional view of the same. Fig. 3 is a detailed view showing a preferred construction of one of my improved rolls.

The machine which I have chosen to illustrate in this application, comprises a frame or housing 1 upon which are mounted a plurality of pairs of rolls preferably in vertical alinement, each pair consisting of oppositely rotating adjacent rolls 2 and 3 driven from a power shaft 4 at unequal speeds as hereinafter described. These rolls exert a rubbing or brushing action upon the treated material from which the animal fiber is to be separated. This material is directed between the rolls by the shield 5, or by any other suitable means, and is pulverized by the rubbing or brushing action. In this pulverized state it is drawn off by the low pressure exhaust 6 as it passes between the successive rolls. In order to provide an efficient rubbing surface for the rolls, I preferably slightly roughen their surfaces or construct them of felt, cloth or other disks 7, clamped together at the ends of the rolls as at 8. See Fig. 3. It is evident however, that the rubbing action itself is not due entirely to the surface of the rolls, but is produced both by the different speeds and the different directions of rotation of the rolls. In order to separate the materials more effectually as they are fed to the rolls, I provide a top pair 9 with a nap or brush-like surface. This surface may be secured by the use of wire cloth or other suitable means.

The set of high speed rolls 2 may be rotated in a clock-wise direction at a speed of approximately thirty-five (35) revolutions per minute if desired. They are provided with any suitable transmission gears such as for instance, the sprocket 10, the chain 11 and a sprocket 12, suitably fixed to a power shaft 13. This power shaft 13 extends across the top of the machine parallel with the rolls and is supported on the frame 1 in suitable bearings 14. At one end of this shaft is attached a bevel gear 15. This gear 15 meshes with a gear 16 on a shaft 17 extending in a vertical direction along the entire height of the machine at one side thereof and suitably mounted in bearing blocks 18 near the bottom and top of the frame 1. Carried so as to rotate with this shaft 17, are bevel gears 19 located at suitable distances apart along the shaft 17. These bevel gears 19 are adapted to mesh with gears 20 carried by the shaft 21 of each roll in the set of rolls 2. It is thus evident that by the arrangement of these gears the rolls 2 are rotated, but in a direction which has been reversed from that obtained by a direct connection to the shaft. It is however of course possible, if desirable, to use a drive for these rolls which is rotated in a direction opposite to that of the shaft 4 and thus avoid the use of this intermediate gearing.

The set of low speed rolls 3 may be rotated in the same direction as the power shaft 4, that is, in a counter-clock-wise direction and at a speed of approximately ten (10) revolutions per minute if desired. Motion is conveyed to them through a transmission gear comprising a sprocket 22, a chain 23 and a sprocket 24 carried on the shaft 25 of the upper set of low speed rolls 3. This shaft 25 is supported by and horizontally adjustable (resiliently, if desired) in suitable bearings 26 in the frame 1, so that the rubbing action of the rolls may be varied. In its mounting, the shaft is exactly similar to all of the other rolls of the low speed set 3. However, near the end of this shaft 25 and between the sprocket 24 and one of the bearings 26, it carries a smaller sprocket 27 which rotates with it and is adapted to transmit the rotation applied to it through a chain 28, to a similarly located sprocket 29 on the next roll. This roll carries a sprocket 30 rotating with the sprocket 29, and through similar means the rotation is transmitted to all of the other rolls in the set 3. In this connection, it is obvious, however, that instead of using a sprocket drive to rotate the rolls, I may use, under certain circumstances, any other suitable drive giving the desired flexibility.

Suitably supported on the upper portion of the frame 1 and by the power shaft 13, is the shield 5 which as shown, may extend transversely across the frame parallel with the sets of rolls 2 and 3, so that material fed into it is directed between the rolls. Suitably supported above this shield or hopper, or at a suitable position within the same, is a roller 31 adapted to be rotated by a traveling apron 32 which supplies the treated fibrous material to the hopper and is made to move by any suitable means. If desired, the apron may be actuated by the roller 31, the latter being suitably connected to rotate with the shaft 4.

At the back of the high speed rolls, a dust-collecting chamber 33 is provided. This chamber extends along the back of the rolls 2 and incloses a portion thereof. It is so constructed that the draft apertures 34 occur opposite the spaces between the different rolls in the sets. As the treated vegetable material is ground or pulverized in its passage between the rolls, it is removed while passing between successive rolls by suitable means such as a low pressure exhaust 6 which draws off this pulverized material through a contracted portion at the bottom of the dust collector. Adjacent this exhaust and beneath the rolls, any suitable means may be provided to receive the separated animal fiber which has passed through the rolls. I have illustrated this means as consisting of a screen 36, but it is obvious that any other collecting means may be employed if desired.

Suitably mounted on the frame 1 and extending along and over the gears and the sprockets on each side thereof, may be gear casings 35, which serve to prevent any accidental contact with the moving parts, but at the same time, are capable of rendering them readily accessible if desired.

From the foregoing, the operation of my machine may be readily understood. The fibrous material is first subjected to any desired treatment to reduce or break down the fibrous structure of the vegetable material.

Then the treated fibrous material is fed to the traveling apron 32 which carries it to the hopper, the material being suitably dried in passage as by passing it through a heating or drying chamber. From the hopper, the fibrous material, still maintaining its original form, although the fibrous structure of the vegetable material is broken down, is fed between the rolls 5 and 6. By the rotation of these rolls in opposite directions, and the rotation of one set at a higher speed than the other, the surfaces of these rolls are made to exert a decided rubbing or grinding action upon the material which, as the same is fed downward, gradually disintegrates the woven structure of the material without tearing or injuring the animal fiber. At the same time, the reduced fiber is pulverized until it takes the form of a dust which, being light, is readily sucked away by the exhaust as the mass passes between successive rolls. Thus it is seen that the heavier material, the animal fiber, which has not been affected by the treatment to break down the fibrous structure of the vegetable material, is effectually separated as it passes through the rolls and may be collected in any suitable receptacle beneath the same.

By the use of my improved machine I am able to reclaim all of the animal fiber from the adhering vegetable fiber, due to the effective rubbing action of the rolls and the fact that no screens are employed through which the separated animal fiber may fall and again become mixed with the vegetable material. Further, by the use of the rubbing and brushing rolls and the low pressure exhaust, I am able to effectively pulverize all of the adhering vegetable material and remove the same so that the hair or other animal fiber obtained by the use of my machine is very clean. Again, by the use of the rubbing rolls, I am able to obtain a product in which the fibers are not broken or otherwise mutilated as they are by machines in which beaters are employed. Further, by the use of my improved machine I am able to effectively and economically separate the hair or other wiry fibers from the vegetable material associated therewith and to reclaim the valuable fibers contained in scraps of this character which have heretofore been obliged to be wasted on account of the difficulty experienced in attempting to separate the fibers. It is of course obvious that my improved machine will operate readily upon any material wherein one or more of the constituent parts of the same has been reduced by any process.

In describing the embodiment of my invention illustrated in this application, I wish it to be distinctly understood that I do not desire to limit myself to the particular construction herein shown, but that I consider this construction as but illustrative of my invention and have in contemplation all modifications or adaptations of this machine which would operate upon its principles and be included within the scope of the appended claims.

What I claim as my invention and desire to secure by Letters Patent of the United States, is:—

1. A machine for separating animal fiber from non-fibrous material, comprising a series of rolls, an opposite series of rolls in frictional relation thereto, said rolls being adapted to disintegrate the mass, means for rotating said rolls at different speeds, and in opposite directions, means for feeding the unseparated material to said rolls and means for removing the non-fibrous material as it passes between the rolls.

2. In a machine for separating animal from vegetable fibers, a plurality of rubbing rolls for disintegrating the materials having frictionally engaging roughened surfaces.

3. In a machine for separating animal from vegetable fiber, a plurality of oppositely rotating rolls in frictional engagement with each other, one of said rolls being formed of a plurality of felt disks.

4. In a machine for separating animal from vegetable fiber, a plurality of oppositely rotating rolls having frictional engaging surfaces, said rolls being arranged to rotate at different speeds to exert a rubbing and brushing disintegrating action upon the material to be separated.

5. In a machine for separating animal fiber from vegetable fiber after the latter has been reduced, the combination of a plurality of sets of oppositely rotating rolls arranged one above the other for exerting a rubbing and brushing action upon the materials to pulverize the reduced vegetable material.

6. A machine for separating animal and vegetable fiber after the vegetable fiber has been reduced including a plurality of oppositely rotating rolls rotatable at different speeds and having their adjacent surfaces roughened and in frictional engagement to exert a rubbing and brushing action upon said materials to pulverize said reduced vegetable fiber.

7. A machine for separating animal and vegetable fiber after the latter has been reduced including a plurality of rolls rotating in opposite directions and at different speeds, said rolls having their surfaces roughened and in frictional contact to exert a rubbing and brushing action upon said materials to pulverize said reduced vegetable material and means for removing one of said materials.

8. In combination, a frame, a plurality of sets of oppositely rotating rubbing rolls carried one above the other in said frame, said rolls being provided with frictionally engaging surfaces, means for rotating said rolls in opposite directions and at different speeds, means including a traveling apron for feeding a material to the upper end of said rolls, and means for removing a portion of said material as the other portion thereof is feeding successively between said rolls.

9. In a machine for separating animal and vegetable fibers after the latter has been reduced, a frame, a plurality of rubbing and brushing rolls mounted therein one above the other, means for feeding the animal and vegetable fibers to said rolls, means for actuating said rolls to exert a rubbing and brushing action upon said fibers, and means for removing one of said fibers as the other is fed successively between said sets of rolls.

10. In a machine for separating animal and vegetable fibers after the latter has been reduced, a frame, a plurality of rubbing and brushing rolls mounted therein one above the other, means for rotating said sets of rolls in opposite directions and at different speeds, means for feeding the mixed fibers to the upper end of said sets of rolls, means for receiving one of said fibers at the lower end of said sets of rolls and means for removing one of said fibers as the other is passed between successive sets of said rubbing and brushing rolls.

11. In a machine for separating animal from vegetable fiber, a frame, a plurality of rubbing and brushing rolls carried therein, said rolls having felt surfaces in frictional engagement with each other, and one of said rolls being yieldably mounted, means for rotating said rolls in opposite directions and at different speeds, means for feeding the mixed fibers to said rolls, means for receiving one of said fibers after it has been fed between the rolls and means for removing one of said fibers as the other is passed between said rolls.

12. In a machine for treating cloth of mixed animal and vegetable fibers to separate the cloth into its component elements, a plurality of rubbing rolls in frictional engagement, means for feeding the cloth between said rolls, means for rotating the rolls on one side of said cloth in a uniform direction, and means for rotating the rolls on the other side of said cloth in the opposite direction and at a different rate of speed from said first rolls, whereby one of the components of said cloth may be pulverized.

In witness whereof, I have hereunto subscribed my name in the presence of two witnesses.

ISRAEL BARNETT.

Witnesses:
HARRY NATHAN,
CHAS. LITOW.

Copies of this patent may be obtained for five cents each, by addressing the "Commissioner of Patents, Washington, D. C."